United States Patent

[11] 3,628,913

| [72] | Inventor | Keith L. Uhland |
| | | Wilmington, Del. |
| [21] | Appl. No. | 868,341 |
| [22] | Filed | Oct. 22, 1969 |
| [45] | Patented | Dec. 21, 1971 |
| [73] | Assignee | E. I. du Pont de Nemours and Company |
| | | Wilmington, Del. |

[54] PROCESS FOR RECOVERING TITANIUM TETRACHLORIDE FROM TITANIFEROUS ORE
5 Claims, 1 Drawing Fig.

[52] U.S. Cl. .................................................. 23/87 T,
23/87 R, 55/69, 55/71, 165/1
[51] Int. Cl. .................................................. C01g 23/02,
C01g 49/10
[50] Field of Search ........................................ 23/87 T, 87;
55/71, 69

[56] References Cited
UNITED STATES PATENTS

| 1,814,392 | 7/1931 | Low et al. .................. | 23/87 |
| 2,245,358 | 6/1941 | Pechukas .................. | 23/87 X |
| 2,668,424 | 2/1954 | Mueller ..................... | 23/87 X |
| 2,675,891 | 4/1954 | Frey .......................... | 23/87 X |
| 2,849,083 | 8/1958 | Nelson et al. ............ | 23/87 X |
| 2,897,918 | 8/1959 | Schlotthauer et al. .... | 23/87 X |
| 2,925,145 | 2/1960 | Hayden ..................... | 55/69 |
| 2,940,541 | 6/1960 | Plant ......................... | 62/58 |
| 2,953,218 | 9/1960 | Coates ...................... | 23/87 X |
| 2,999,733 | 9/1961 | Groves ..................... | 23/87 |

*Primary Examiner*—Edward Stern
*Attorney*—Frank R. Ortolani

ABSTRACT: This invention relates to a process for transferring effluent containing ferrous chloride and titanium tetrachloride resulting from high-temperature chlorination of titaniferous materials from a chlorination furnace through a conduit to a spray condenser for separation of vaporous titanium chloride. During the transfer, the effluent is kept at least 20° C. above the ferrous chloride dew point by controlling heat loss from the conduit.

PATENTED DEC 21 1971
3,628,913
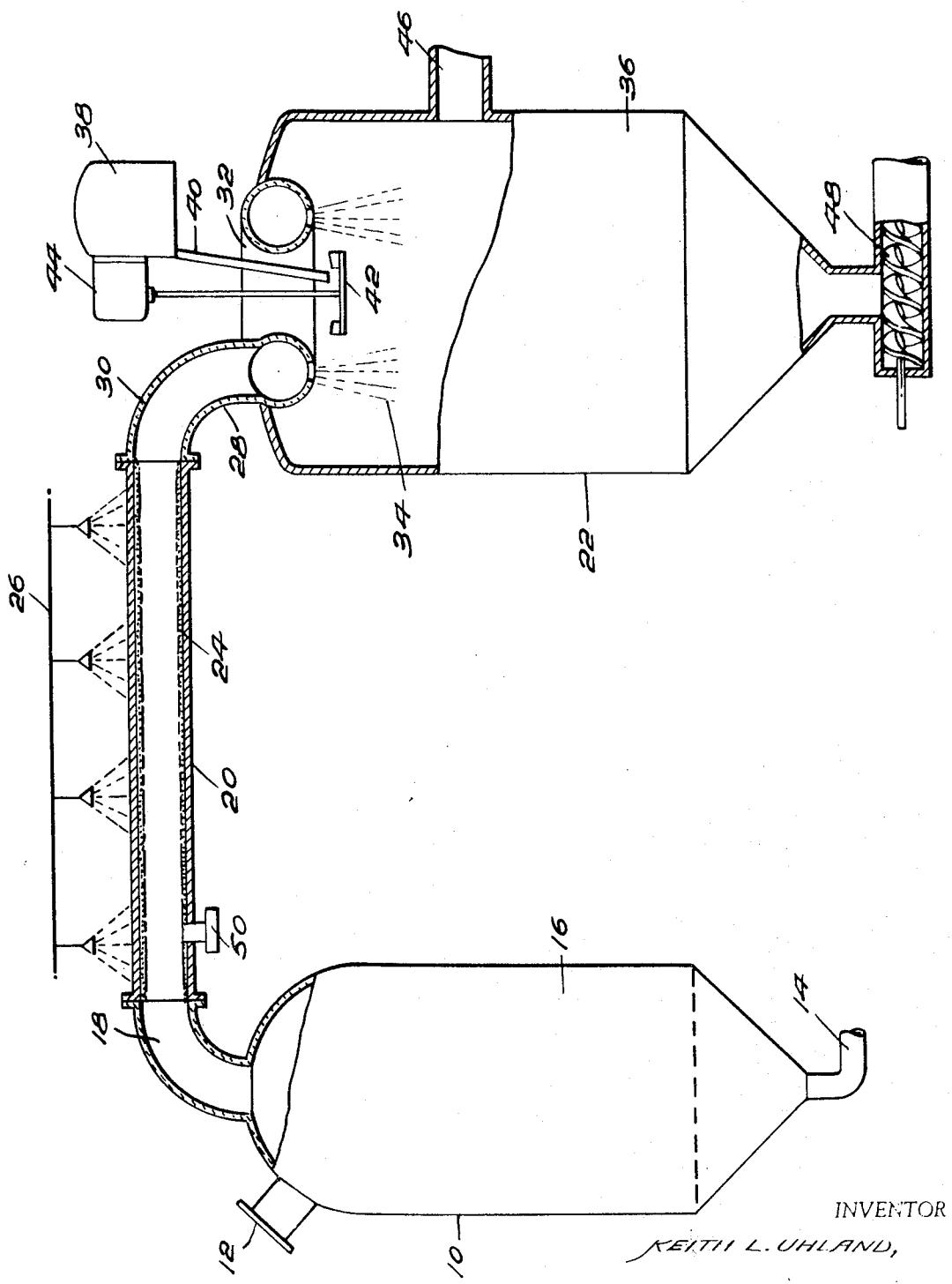
INVENTOR
KEITH L. UHLAND,

PROCESS FOR RECOVERING TITANIUM TETRACHLORIDE FROM TITANIFEROUS ORE

BACKGROUND OF THE INVENTION

This invention pertains to a method of transferring effluent containing ferrous chloride and titanium tetrachloride from a chlorination furnace to a titanium tetrachloride separator. More particularly, this invention pertains to a method of transferring the effluent without fouling and plugging of the transfer apparatus.

Titanium tetrachloride is manufactured by the high-temperature chlorination of titaniferous materials such as ilmenite, beneficiated ilmenite, mineral rutile, and slags. The chlorination is carried out by contacting chlorine gas with the titaniferous materials at 900° to 1,200° C. The effluent from the chlorination furnace is then transferred through a transfer apparatus, usually a duct, to a titanium tetrachloride separator. The titanium tetrachloride separator is normally a spray condenser in which the impurities in the effluent are condensed and the titanium tetrachloride remains in the gaseous state. U.S. Pat. No. 2,446,181 describes such a method of separation.

The major metallic chlorides in the effluent are titanium tetrachloride, ferrous chloride and ferric chloride. In the past, the presence of ferrous chloride has created problems of fouling and plugging the transfer apparatus as a result of its high-dew point ranging from 650° to 850° C. This problem has been solved by reducing the amount of ferrous chloride in the system by reacting the iron to ferric chloride which remains gaseous above about 300° C. However, producing ferric chloride requires greater chlorine consumption thus a greater expense is incurred per pound of product titanium tetrachloride.

Another problem is the corrosive nature of the effluent on the transfer apparatus. Various solutions have been offered to solve this problem. The use of ceramic ducts has been proposed, but in practice their expensiveness and fragility have discouraged their use. Ducts constructed of corrosion proof alloys are also undesirable because of cost. Currently the industry uses ordinary steel ducts, externally cooled to cause an internal coating of ferric chloride on the steel forming an insulating thickness thereby enabling the surface of the steel to be maintained at a temperature less conducive to chemical attack. This procedure is described in U.S. Pat. No. 2,668,424.

It is the object of this invention to enable a high-ferrous chloride effluent to be transferred from a chlorination furnace to a spray condenser without resulting in fouling or plugging of the transfer apparatus. It is a further object of this invention to render the transfer apparatus corrosion resistant to the effluent.

SUMMARY OF THE INVENTION

In the process of this invention a titaniferous ore containing iron is reacted with gaseous chlorine in a furnace at about 900° to 1,200° C. The quantity of chlorine is regulated to obtain titanium tetrachloride and a high ratio of ferrous chloride to ferric chloride. The chlorides are in a superheated gaseous state in the furnace. The gases are then transferred to a spray condenser. It is essential to this process that the gases remain at least 20° C. above the ferrous chloride dew point. In the spray condenser the gases are jetted downward and then contacted and mixed with a recycled titanium tetrachloride liquid causing solidification of the impurities such as iron chloride and vaporization of the titanium tetrachloride.

The FIGURE of the drawing is a schematic vertical section view of one type of apparatus that can be used in practicing the invention.

Broadly the apparatus of this invention comprises a chlorination furnace, a spray condenser for separating the titanium tetrachloride from impurities, and a duct to carry effluent gases containing titanium tetrachloride from the chlorination furnace to the spray condenser.

A titaniferous ore containing iron enters a chlorination furnace 10 through an ore-inlet port 12. The ore is in a pulverulent state and is mixed with finely-divided solid carbonaceous fuel prior to the entry. Chlorine gas enters through gas inlet port 14 and combines with the ore in reaction zone 16. The ore is maintained in a fluidized bed. An effluent containing titanium tetrachloride exits from the reaction zone through outlet port 18. The effluent then passes through transfer duct 20 to spray condenser 22. The transfer duct 20 has an inner surface of ferrous chloride 24 for protection and insulation from the hot, corrosive effluent. A cooling device 26 is provided on the exterior of the transfer duct to enable the ferrous chloride on the inner surface of the duct to remain a solid. The effluent enters the spray condenser 22 by passing from inlet port 28 which is provided with ceramic insulation 30 to a circular vapor distributor 32 which is also insulated with ceramic 30. The distributor forms the effluent into a descending cylindrical curtain of vapor 34 which enters spray chamber 36. Liquid titanium tetrachloride is supplied to the spray condenser from storage tank 38. The liquid titanium tetrachloride passes from the tank through pipe 40 to impeller 42 situated on the axis of the cylindrical curtain of vapor. Upon contact with the impeller, the liquid titanium tetrachloride is dispersed into fine drops which are projected into violent contact with the curtain of vapor. The impeller is driven by motor-drive 44. Titanium tetrachloride vapor exits through port 46, and solidified iron chlorides are removed from the spray condenser by a conveyor 48. An insulated waste trap 50 is provided on the transfer duct to remove excess liquid ferrous chloride.

In the process of this invention the chlorination reaction of the titaniferous ore containing iron can be carried out with a restricted amount of chlorine gas since the presence of ferrous chloride in the effluent is not detrimental. It is desirable to limit the chlorine to the extent where the iron chloride in the effluent gas has a mole ratio of ferrous chloride to ferric chloride of at least 1 and preferably more than 9.

It is essential that the temperature of the effluent in the transfer duct be superheated to a bulk temperature of at least 20° C. above the dew point of the ferrous chloride. The term "superheat" refers to the ferrous chloride being in the gaseous state at a temperature above which it would return to a liquid. The term "bulk temperature" refers to the average temperature. This superheat has been found to eliminate problems of fouling and plugging of the transfer apparatus when using a high ferrous chloride-containing effluent. The dew point of the ferrous chloride varies with the composition of the effluent. Diluting the effluent with an inert gas or titanium tetrachloride has the effect of lowering the dew point of ferrous chloride. Diluents may be useful for temperature control. Carbon dioxide, carbon monoxide, and nitrogen, diluents commonly found in the effluent, are products of combusting a carbonaceous fuel in the chlorination furnace to obtain the high temperatures necessary for this process. In actual operation, the dew point of ferrous chloride ranges from approximately 700° to 900° C. For example, a typical operation utilizing ilmenite with 30 percent iron oxide will produce a ferrous chloride dew point of approximately 800° to 850° C.

Since the effluent should be maintained at least 20° C. above the dew point, it is necessary to provide a means of controlling the temperature. The temperature of the effluent entering the transfer duct should be at least 50° C. above the ferrous chloride dew point to maintain sufficient superheat in the system and usually ranges from 900° to 1,100° C.

While the effluent passes through the transfer duct, it is desirable to minimize the condensation of ferrous chloride. One means of control is to add diluents to the effluent, thereby lowering the dew point of ferrous chloride while providing additional enthalpy to the system. The superheat can be maintained by reducing heat loss from the transfer duct by limiting the heat transfer area of the duct or by insulating the duct. Heat loss can be minimized and corrosion checked by careful selection of the materials of construction for the transfer duct.

Examples of such materials are ceramic pipe and metal pipe lined with ceramic or acid proof brick. The preferred construction of the duct utilizes steel pipe due to its relatively low cost and high resistance to breakage. However, if the steel is directly exposed to the effluent, it is vulnerable to excessive chemical attack. The steel can be cooled to prevent corrosion, but cooling creates a problem with maintaining the necessary superheat. It is found that a coating of solid ferrous chloride placed on the inside of the duct, commonly known as a "-skull," will both reduce heat loss from the effluent and reduce the corrosive effect of the effluent.

The skull is maintained by externally cooling the transfer duct in order that a deposit of ferrous chloride develops. The skull reaches a thickness at which its inner surface is at its melting point of 677° C. By establishing a dynamic equilibrium with the effluent being transferred, the bulk temperature of the effluent can be kept at least 20° C. above the ferrous chloride dew point. Some variables which enter into the dynamic equilibrium are the external temperature, the rate of external cooling, the temperature of the effluent, and the velocity of the effluent. These variables can be easily determined during operation by one skilled in the art. Preferably, for example, a through put of 41,500 pounds of effluent per hour should have a gas velocity not exceeding 100 feet per second to minimize the heat transfer between the effluent and skull and minimize the erosion of the heat transfer duct.

As expected, a film of liquid ferrous chloride occurs on the inside of the skull. It is therefore preferable to have the transfer duct slant towards the chlorination furnace to drain the liquid back to the chlorination furnace.

The effluent in the vapor distributor must also be kept at least 20° C. above the dew point of ferrous chloride to prevent fouling and plugging. Accordingly, the superheat in the entering effluent is relied upon for maintaining the distributor at operating temperature. In large installations, high superheat can easily be obtained; however, for reasons of economy, insulation is provided to prevent excessive heat loss. Preferably, the distributor is constructed with corrosion resistant ceramic of low heat conductivity.

By virtue of the temperature control in the distributor the vapors can be ejected freely downward in the form of a cylindrical curtain into the large spray condenser chamber. Partial condensation takes place with liquid titanium tetrachloride being vaporized and the ferric and ferrous chlorides and other impurities being solidified. To prevent the presence of liquid titanium tetrachloride being carried out with the impurities, the amount of titanium tetrachloride used is controlled to maintain the exit temperature of the titanium tetrachloride above its boiling point and preferably in the range of 150° to 280°C.

The following example is illustrative of the invention and is not to be a limitation thereof. All parts and percentages referred to are by weight unless otherwise indicated.

EXAMPLE

This example illustrates the method of operation using a steel transfer pipe and maintaining a protective ferrous chloride skull on its inner surface. The process is described for use in equipment such as depicted in the FIGURE.

A mixture of ilmenite and coke is added to the chlorination at a rate sufficient to produce 122 cubic feet per second of effluent at 950° C. The chlorine gas rate is controlled to yield 12 pounds of ferrous chloride per pound of ferric chloride. The effluent is then fed through the transfer duct to the vapor distributor. The transfer duct is 15 inches in diameter and 45 feet long with a ferrous chloride skull formed by external cooling with water. Effluent passes through the duct at about 41,500 pounds per hour with a gas velocity of approximately 100 feet per second. The thickness of ferrous chloride skull is controlled to give the effluent a bulk temperature of 875° C. upon entering the vapor distributor. At steady state operating conditions, the effluent composition passing into the spray condenser is approximately:

| | |
|---|---|
| Titanium tetrachloride | 60.5 % by weight |
| Unreacted solids | 1.8 |
| Ferrous solids | 11.7 |
| Ferric chloride | 1.5 |
| $CO_2$ | 15.0 |
| CO | 1.0 |
| HCL | 3.7 |
| Other metal chloride | 2.6 |
| Chlorine | 0.1 |
| $N_2$ | 2.1 |

Liquid titanium tetrachloride at 75° to 80° C. is fed to the spray condenser at 107,500 pounds per hour causing the effluent to be cooled to about 190° C. thereby condensing the impurities such as ferrous chloride and ferric chloride to their solid state while maintaining the titanium tetrachloride as a gas. The titanium tetrachloride is then removed from the spray condenser to be purified in further operations while the solids are removed from the bottom of the spray condenser by a screw conveyor.

I claim:

1. A process for recovering titanium tetrachloride from a titaniferous material containing iron comprising chlorinating the titaniferous material to produce effluent having titanium tetrachloride, ferrous chloride and ferric chloride wherein the mole ratio of ferrous chloride to ferric chloride is at least 1; transferring the effluent from the chlorinating step to a condensing step through a transfer duct; controlling the heat loss through the transfer duct by cooling the exterior of the transfer duct to form a coating of solid ferrous chloride on the inside of the duct thereby insulating the duct and maintaining the effluent during the transfer at a bulk temperature of at least 20° C. above the ferrous chloride dew point; and condensing the effluent with liquid titanium tetrachloride to produce solid ferrous chloride and ferric chloride and gaseous titanium tetrachloride.

2. The process of claim 1 wherein the effluent is formed into a descending cylindrical curtain of vapor and is contacted with liquid titanium tetrachloride forming a mixture between 150° and 280° C.

3. The process of claim 1 wherein the mole ratio of ferrous chloride to ferric chloride is at least 9.

4. The process of claim 1 wherein the transfer duct is slanted causing liquid ferrous chloride to drain back to the chlorinating step.

5. The process of claim 3 wherein the transfer duct is slanted causing liquid ferrous chloride to drain back to the chlorinating step.

* * * * *